United States Patent
Li et al.

(10) Patent No.: US 8,255,425 B1
(45) Date of Patent: Aug. 28, 2012

(54) SYSTEM AND METHOD FOR EVENT NOTIFICATION USING AN EVENT ROUTING TABLE

(75) Inventors: Dongfeng Li, Cranberry Township, PA (US); Anton William Knaus, Bethel Park, PA (US)

(73) Assignee: NetApp, Inc., Sunnyvale, CA (US)

( * ) Notice: Subject to any disclaimer, the term of this patent is extended or adjusted under 35 U.S.C. 154(b) by 480 days.

(21) Appl. No.: 11/264,588

(22) Filed: Nov. 1, 2005

(51) Int. Cl.
*G06F 17/30* (2006.01)

(52) U.S. Cl. ........ 707/802; 707/737; 707/781; 707/793; 707/791

(58) Field of Classification Search .................. 707/101, 707/737, 791, 781, 793
See application file for complete search history.

(56) References Cited

U.S. PATENT DOCUMENTS

| | | | |
|---|---|---|---|
| 5,819,292 A | 10/1998 | Hitz et al. | |
| 5,944,782 A * | 8/1999 | Noble et al. | 709/202 |
| 6,502,166 B1 | 12/2002 | Cassidy | |
| 6,564,252 B1 | 5/2003 | Hickman et al. | |
| 6,671,773 B2 | 12/2003 | Kazar et al. | |
| 7,159,093 B2 | 1/2007 | Dalal et al. | |
| 7,174,370 B1 * | 2/2007 | Saini et al. | 709/220 |
| 7,185,144 B2 | 2/2007 | Corbett et al. | |
| 7,302,520 B2 | 11/2007 | Kazar et al. | |
| 7,409,494 B2 | 8/2008 | Edwards et al. | |
| 7,636,424 B1 * | 12/2009 | Halikhedkar et al. | 379/15.01 |
| 2002/0023113 A1 * | 2/2002 | Hsing et al. | 707/513 |
| 2003/0023597 A1 * | 1/2003 | Ha et al. | 707/10 |
| 2003/0097597 A1 * | 5/2003 | Lewis | 713/202 |
| 2003/0188045 A1 | 10/2003 | Jacobson | |
| 2004/0062370 A1 * | 4/2004 | O'Neal et al. | 379/112.01 |
| 2004/0139167 A1 | 7/2004 | Edsall et al. | |
| 2004/0155960 A1 * | 8/2004 | Wren et al. | 348/150 |
| 2004/0205143 A1 * | 10/2004 | Uemura | 709/208 |
| 2005/0144173 A1 * | 6/2005 | Yamamoto et al. | 707/10 |
| 2005/0192932 A1 | 9/2005 | Kazar et al. | |
| 2005/0278383 A1 | 12/2005 | Kazar et al. | |
| 2006/0184731 A1 | 8/2006 | Corbett et al. | |
| 2006/0248294 A1 * | 11/2006 | Nedved et al. | 711/162 |

FOREIGN PATENT DOCUMENTS

| | | |
|---|---|---|
| JP | 10003440 | 6/1998 |
| WO | WO 00/07101 | 2/2000 |

OTHER PUBLICATIONS

"Using the ISIS resource manager for distributed, fault-tolerant computing." Clark T. A. et al. Proceeding of the Twenty-Sixth Hawaii International Conference on System Sciences (CAT. No. 93TH0501-7) IEEE Los Alamitos, CA, USA, 1993, pp. 257-265 vol. 1, XP010640439, ISBN: 0-8186-3230-5.

Brinkmann, A., et al., "Efficient, Distributed Data Placement Strategies for Storage Area Networks" XP-002404501, 10 pages.

(Continued)

*Primary Examiner* — Angela Lie
*Assistant Examiner* — Fatima Mina
(74) *Attorney, Agent, or Firm* — Cesari and McKenna, LLP (57) ABSTRACT

A system and method efficiently conveys event notification using an event routing table. An event is detected and forwarded to an event management system (EMS) that determines if any thresholds have been exceeded. If a threshold has been exceeded, one or more destination names from a routing table are expanded using a destination table and appropriate event notifications are sent.

11 Claims, 9 Drawing Sheets

OTHER PUBLICATIONS

Ganger, Gregory R., et al., "Disk Subsystem Load Balancing: Disk Striping vs. Conventional Data Placement" Department of Electrical Engineering and Computer Science, University of Michigan, Ann Arbor, 10 pages.

Hartman, J. H., et al., "Zebra: A Striped Network File System" Proceedings of the Usenix File Systems Workshop, Apr. 1998 pp. 1-9, XP002926950.

Hartman, J. H., et al., "The Zebra Striped Network File System" Dec. 1, 1993, Operating Systems Review, ACM, New York, NY, US, pp. 29-43, XP000418681, ISSN: 0163-5908.

Network Appliance, Inc., Notification of Transmittal of the International Search Report and the Written Opinion of the International Searching Authority, or the Declaration, International Application No. PCT/US2005/030889, International Filing Date: Aug. 31, 2005, Date of Mailing of Document: Jan. 13, 2006, 7 pages.

Network Appliance, Inc., Notification of Transmittal of the International Search Report and the Written Opinion of the International Searching Authority, or the Declaration, International Application No. PCT/US2006/016055, International Filing Date: Apr. 27, 2006, Date of Mailing of Document: Nov. 9, 2006, 10 page.

Ho, T. K., et al., "A Row Permutated Data Reorganization Algorithm for Growing Server-Less Video-On-Demand Systems", Department of Information Engineering, The Chinese University of Hong Kong, Shatin, N.T., Hong Kong, May 12, 2003, 8 pages.

Honicky, R. J., et al., "A Fast Algorithm for Online Placement and Reorganization of Replicated Data", Storage Systems Research Center, University of California, Santa Cruz, Apr. 22, 2003, 10 pages.

Simitch, H., et al., "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, pp. 88-102, XP010376289.

Shinkai, E., et al., "HAMFS File System" Reliable distributed systems, 1999. Proceedings of the 18th IEEE Symposium on Lausanne, Switzerland, Oct. 19-22, 1999, Los Alamitos, CA, USA, IEEE Comput. Soc., US, Oct. 19, 1999, pp. 190-201, XP010356993.

* cited by examiner

SYSTEM AND METHOD FOR EVENT NOTIFICATION USING AN EVENT ROUTING TABLE

FIELD OF THE INVENTION

The present invention relates to event management systems and, more particularly, to event notification using an event routing table.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

Many storage systems include an event monitoring system (EMS) that conveys appropriate system information and event notifications to system administrators and/or other interested parties, such as a vendor's customer support staff. Most UNIX-based systems use the conventional syslog program as an EMS. An administrator may configure syslog to forward event notifications based on severity level and module that generated the event. For example, an administrator may configure the syslog to send all events of a critical level from the kernel of the storage operation system to the administrator. No other levels of granularity may be specified when using the syslog program. However, a noted disadvantage of such syslog-based systems is that they typically produce too many event notifications. A single event may be generated multiple times, thereby resulting in the administrator receiving multiple notifications for the same event. As a result, certain event occurrences may generate tens or hundreds of identical event messages, which can overwhelm an administrator and potentially obscure other more important, event notifications.

Another noted disadvantage of the syslog program is that different vendors may assign different levels of severity to events. For example, an event which the vendor deems as routine may be deemed by the administrator to be critical. Consequentially, the administrator may configure syslog to send event notifications for all routine events, to ensure notification of the one routine event that is of interest. However, this results in the administrator receiving numerous unwanted event messages, i.e., event notifications for all other events that the vendor deems to be routine, even though they are of no interest to the administrator.

A further noted disadvantage of the syslog program is that syslog is limited to a single node. In clustered systems, syslog has no knowledge of other nodes in the same cluster, which results in an inability to filter duplicate event notification messages that are generated from different storage systems. For example, a disk array failure may cause multiple copies of the same event notification to be generated from each storage system connected to the disk array. Syslog is unable to filter these messages, thereby resulting in an administrator receiving numerous duplicate event notification messages.

SUMMARY OF THE INVENTION

The disadvantages of the prior art are overcome by providing a system and method for efficiently conveying event notifications in a storage system cluster using an event management system (EMS). An event routing table is illustratively stored within a replicated database (RDB) of the cluster so that it is accessible from each node or storage system in the cluster. The routing table contains a plurality of entries, each of which is associated with an event. Each entry identifies a type of event and one or more destination names to be notified should the event occur. Additionally, one or more threshold values of the entry may be set to limit the number of repeated occurrences of a particular event notification. Illustratively, the threshold values include occurrence and time threshold values that are user configurable (set). The occurrence threshold functions to suppress event notifications of the identified event type until a certain number of occurrences of the event has occurred. The time threshold suppresses event notifications of the event type until the configured amount of time has elapsed from the previous event notification.

The RDB also includes a destination table configured to map user-defined destination names to one or more destinations. The destinations may comprise, e.g., e-mail addresses, simple network management protocol (SNMP) clients, or remote syslog demons.

In response to the occurrence of an event, the EMS first determines if any threshold values have been exceeded for that event. If no threshold values have been exceeded, then the EMS suppresses any event notification and updates a history database to track the last occurrence of the event. However, if any of the threshold values have been exceeded, the EMS retrieves the appropriate destination names from the routing table and accesses the destination table to expand the destination names. The event notifications are then sent to all destinations identified by the destination table.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
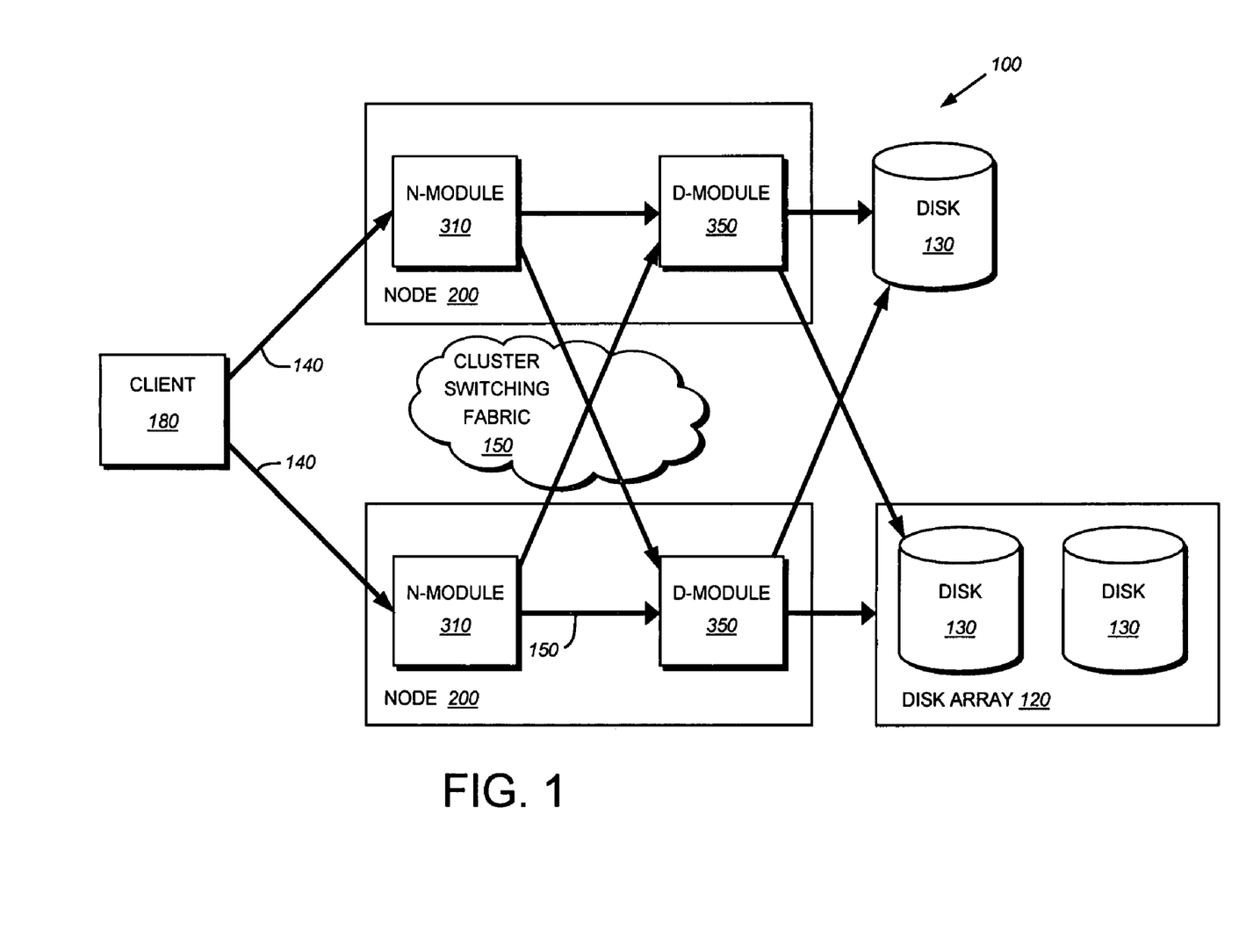
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The disks 130 may be connected to more than one D-module in order to facilitate failover operations. This multi-connectivity means that an event notification message generated by a disk 130 may be received by more than one D-module. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al. issued Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
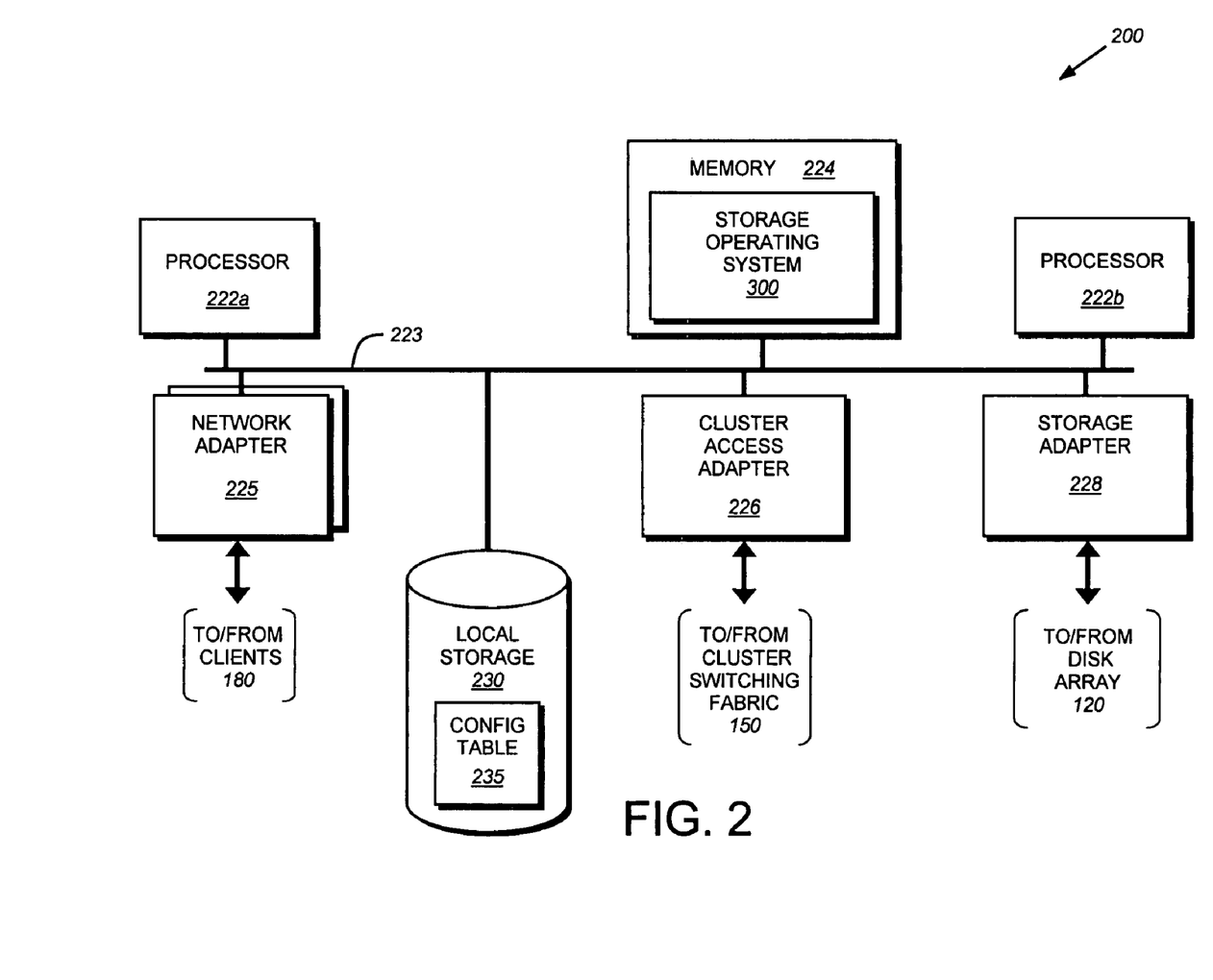
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 600 (see FIG. 6). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

Figure 3:
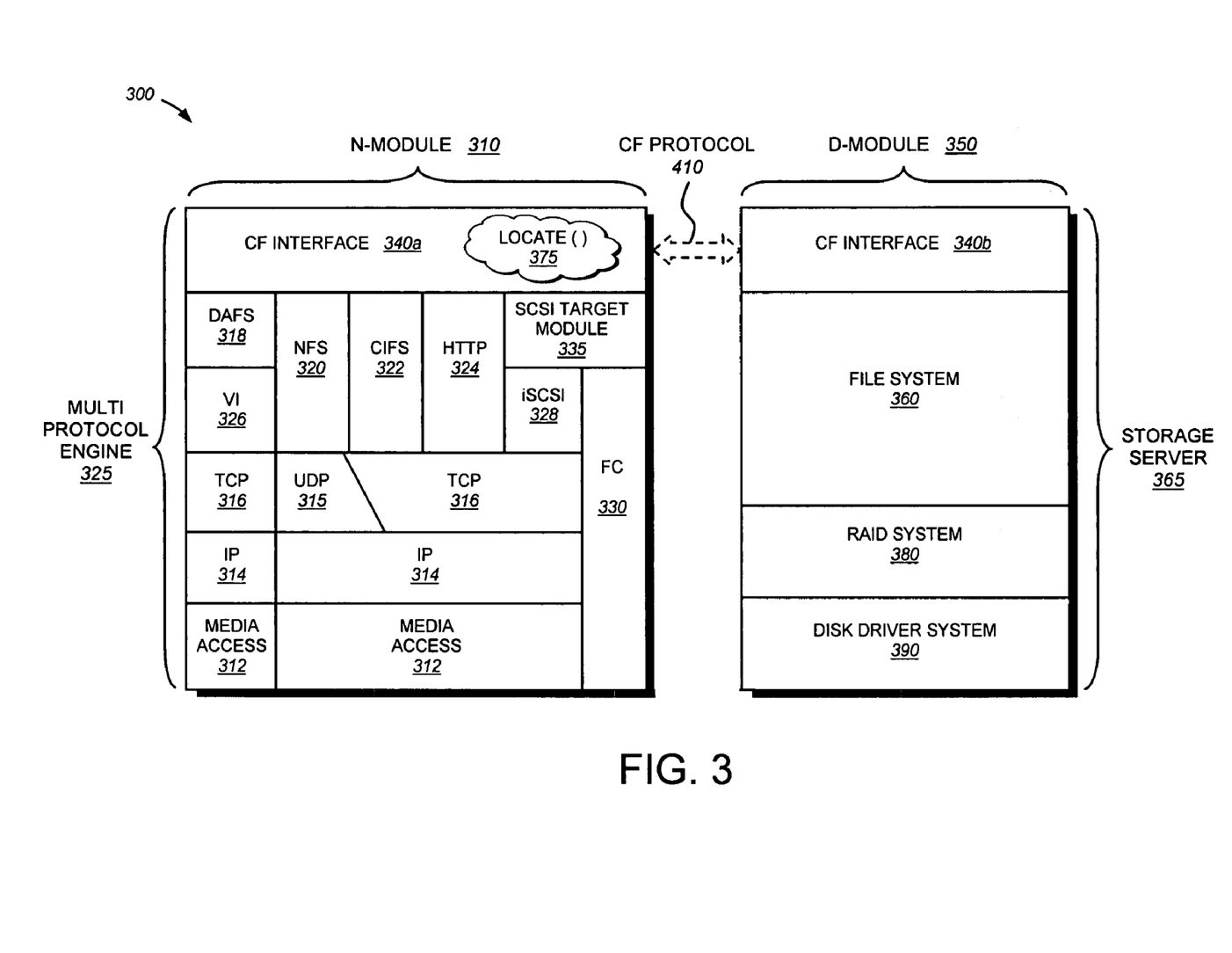
FIG. 3 is a schematic block diagram of a storage operating system that may be advantageously used with the present invention.

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSIspecific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 610 (see FIG. 6), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block locals tion). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the zo processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should to therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340*a,b* adapted to implement intra-cluster communication among the modules, including D-module-toD-module communication for data container access operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. The CF interface 340a implements a Locate ( ) function 375 that is utilized by the multi protocol engine 325 to identify which storage server 365 is currently hosting a particular data container, such as a volume. The Locate ( ) function 375 utilizes a volume location database (VLDB), described further below, to track which storage server 365 currently hosts a given data container. In either case, the CF decoder of CF interface 340b on D-module 350 de-encapsulates the CF message and processes the file system command.

Figure 4:
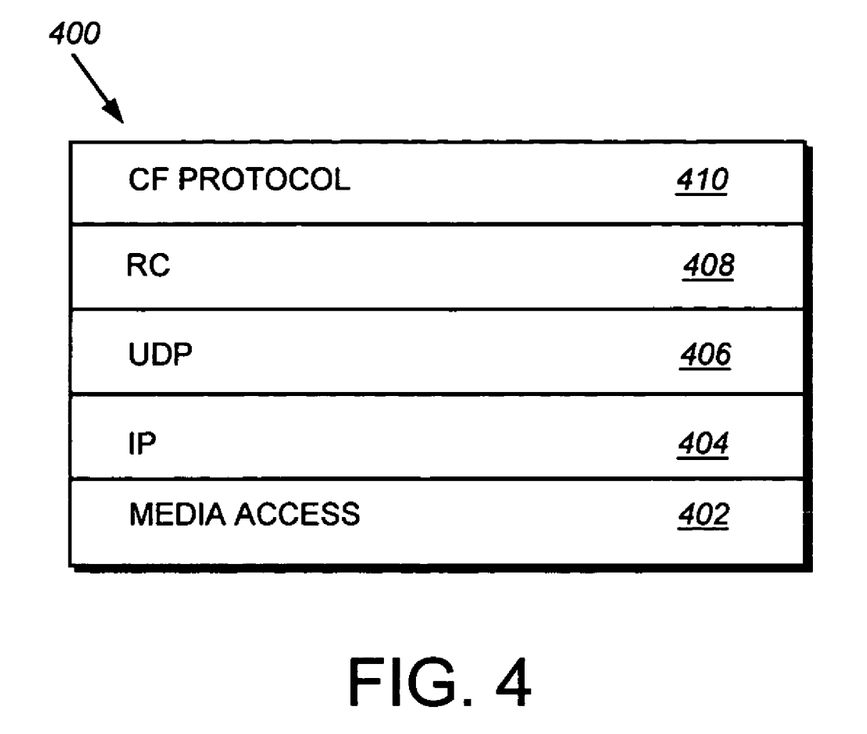
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
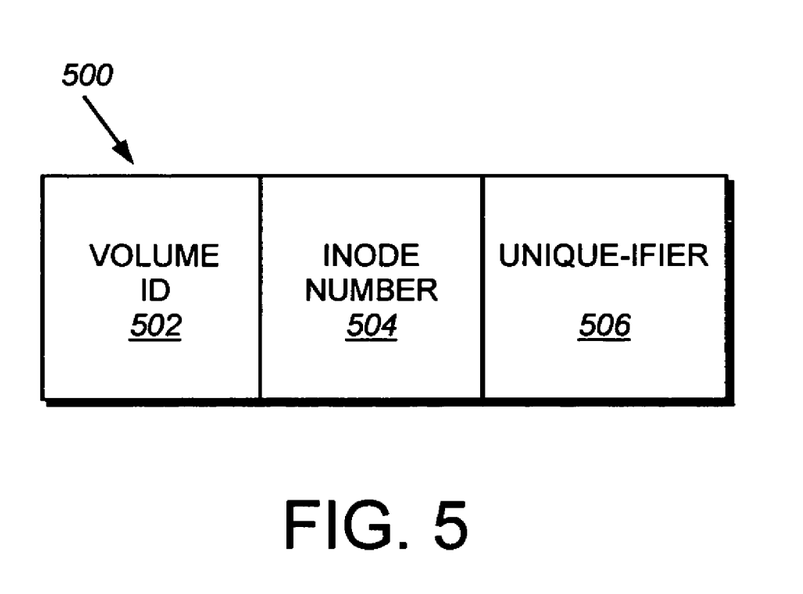
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a volume identifier (ID) field 502, an inode number field 504 and a unique-ifier field 506. The volume ID field 502 contains a global identifier (within the cluster 100) of the volume within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields.

E. Management Processes

Figure 6:
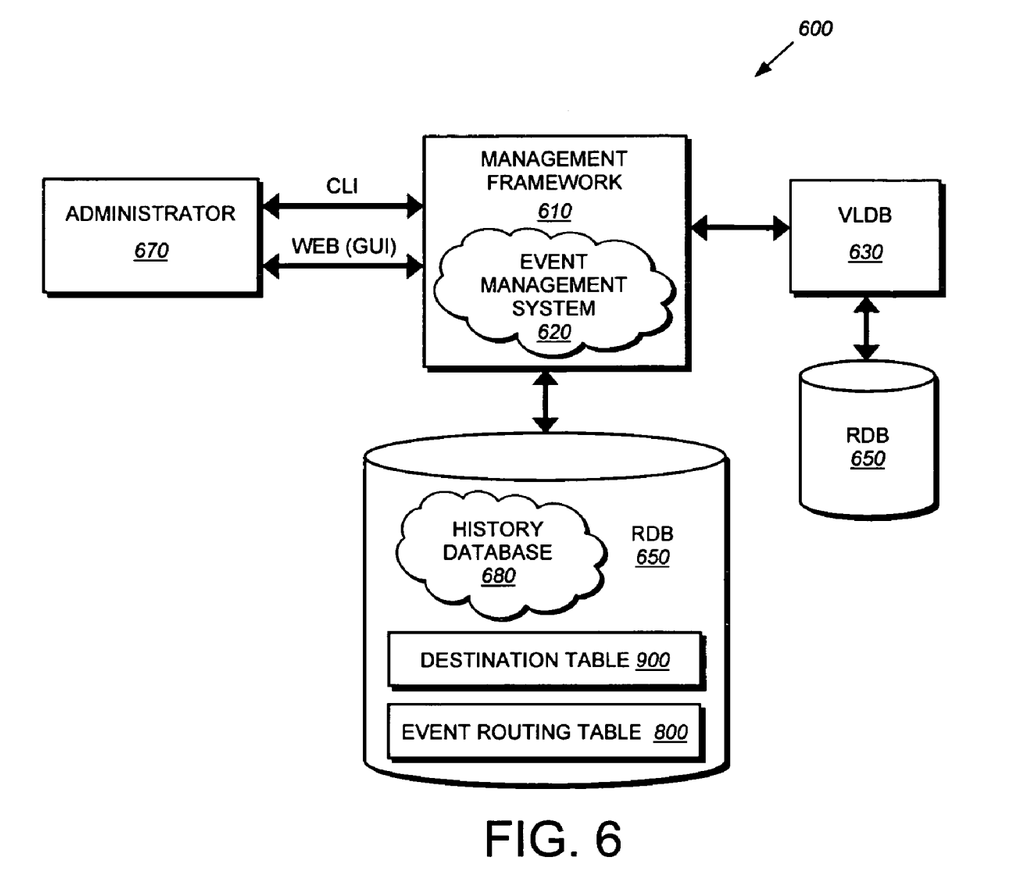
FIG. 6 is a schematic block diagram illustrating a collection of management processes in accordance with an embodiment of the present invention.

FIG. 6 is a schematic block diagram illustrating a collection of management processes that execute as user mode applications 600 on the storage operating system 300 to provide management of configuration information (i.e. management data) for the nodes of the cluster. To that end, the management processes include a management framework process 610 that includes an event management system (EMS) 620 and a VLDB process 630, each utilizing a data replication service (RDB 650) linked as a library. The management framework 610 provides a user interface to an administrator 670 via a command line interface (CLI) and/or a web-based graphical user interface (GUI). The EMS 620 is configured to convey event notifications to the administration via the CLI and for GUI. The management framework is illustratively based on a conventional common interface model (CIM) object manager that provides the entity to which users/system administrators interact with a node 200 in order to manage the cluster 100.

The VLDB 630 is a database process that tracks the locations of various storage components (e.g., volumes, flexible volumes, aggregates, etc.) within the cluster 100 to thereby facilitate routing of requests throughout the cluster. In the illustrative embodiment, the N-module 310 of each node accesses a configuration table 235 that maps the volume ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the volumes within the cluster. Examples of such VLDB entries include a VLDB volume entry 700, as shown in FIG. 7.

Figure 7:
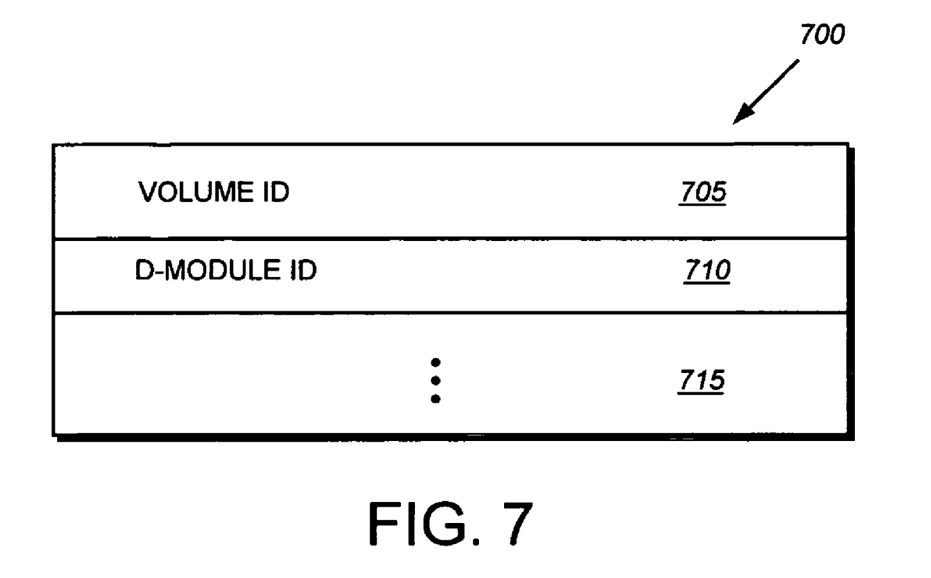
FIG. 7 is a schematic block diagram of a VLDB volume entry in accordance with an embodiment of the present invention.

Specifically, FIG. 7 is a schematic block diagram of an exemplary VLDB volume entry 700. The entry 700 includes a volume ID field 705, an D-module ID field 710 and, in alternate embodiments, additional fields 715. The volume ID field 705 contains an ID that identifies a volume used in a volume location process. The D-module ID field 710 identifies the D-module hosting the volume identified by the volume ID field 705.

The VLDB illustratively implements a RPC interface, e.g., a Sun RPC interface, which allows the N-module 310 to query the VLDB 630. When encountering contents of a data container handle 500 that are not stored in its configuration table, the N-module sends an RPC to the VLDB process. In response, the VLDB 630 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 600.

To that end, the management processes have interfaces to (are closely coupled to) RDB 650. The RDB comprises a library that provides a persistent object store (storing of objects) for the management data processed by the management processes. Notably, the RDB 650 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

Figure 8:
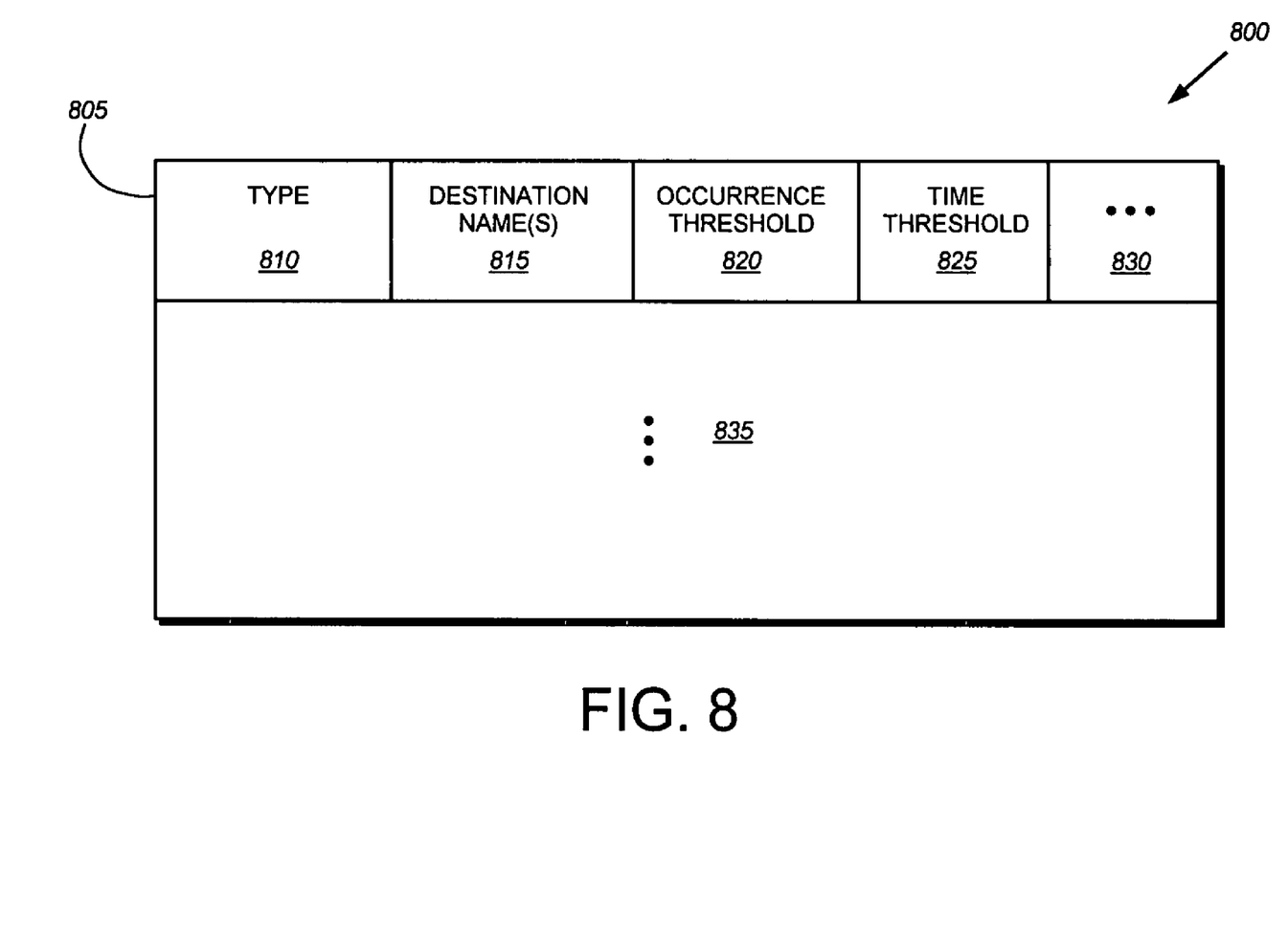
FIG. 8 is a schematic block diagram of an exemplary event routing table in accordance with an embodiment of the present invention.
Figure 9:
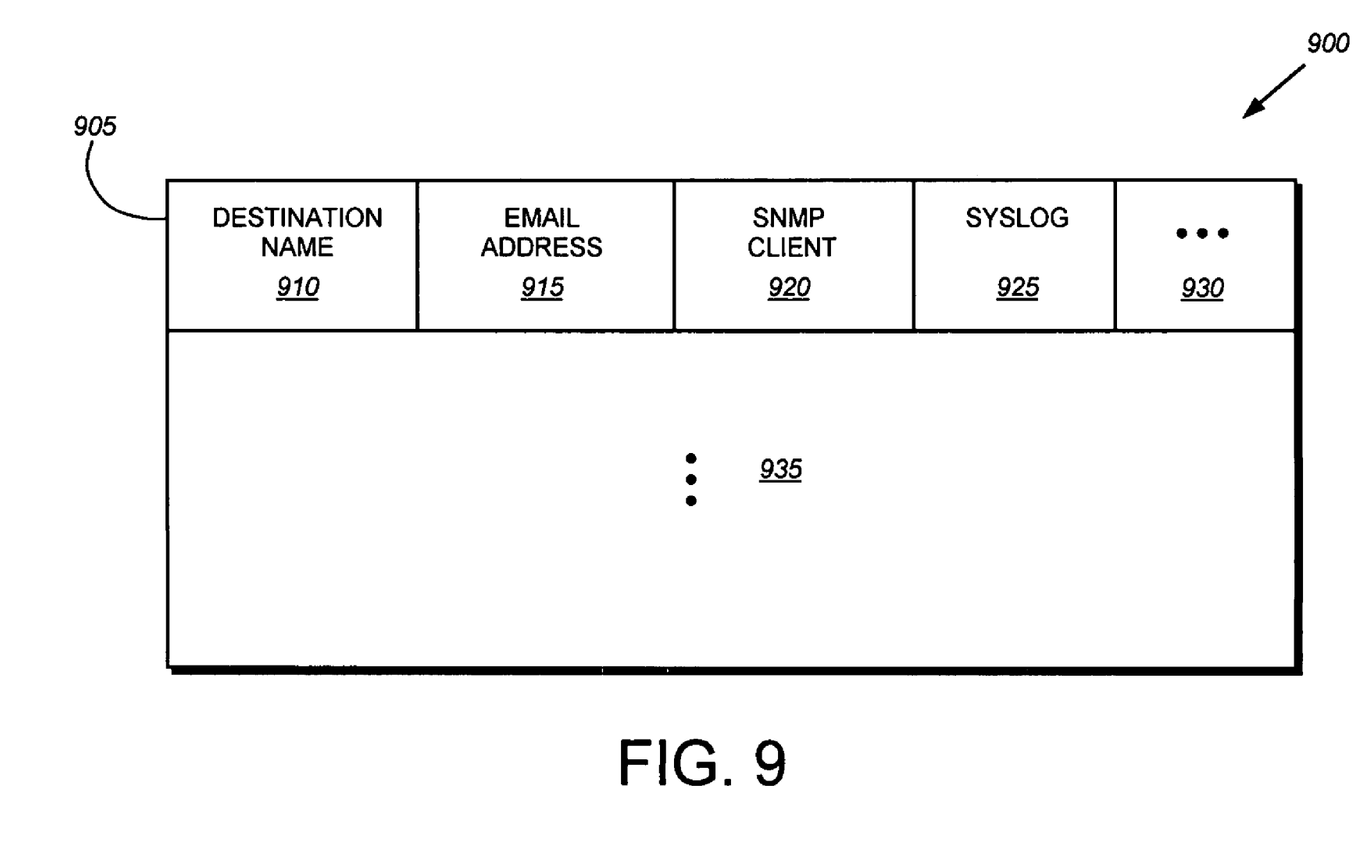
FIG. 9 is a schematic block diagram of an exemplary destination table in accordance with an embodiment of the present invention.

In accordance with the illustrative embodiment of the present invention, the EMS 620 of the management framework 610 utilizes the RDB 650 to store an event routing table 800 and a destination table 900, described further below, so that they are accessible by all nodes of the cluster. It should be noted that in alternate embodiments, the EMS may be located in other modules of the storage system or may reside in another computer within a storage system environment. As such, the description of the EMS being located as a user mode application on the storage operating system should be taken as exemplary only.

F. Event Notification

The present invention provides a system and method for efficiently conveying event notifications in a storage system cluster using an EMS. The event routing table, contains a plurality of entries each of which are associated with an event. Each entry identifies a type of event and one or more destination names to be notified should the event occur. Additionally, one or more threshold values of the entry may be set to limit the number of repeated occurrences of a particular event notification. Illustratively, the threshold values include occurrence and time threshold values that are user configurable (set). The occurrence threshold functions to suppress event notifications of the identified event type until a certain number of occurrences of the event has occurred. The time threshold suppresses event notifications of the event type until the configured amount of time has elapsed from the previous event notification.

The RDB 650 also includes destination table 900 configured to map user-defined destination names to one or more destinations. The destinations may comprise, e.g., email addresses, simple network management protocol (SNMP) clients, or remote syslog demons.

In response to the occurrence of an event, the EMS first determines if any threshold values have been exceeded for that event. If no threshold values have been exceeded, then the EMS suppresses any event notification and updates a history database 680 on the RDB 650 to track the last occurrence of the event. However, if any of the threshold values have been exceeded, the EMS retrieves the appropriate destination names from the routing table and accesses the destination table to expand the destination names. The event notifications are then sent to all destinations identified by the destination table.

FIG. 8 is a schematic block diagram of an exemplary event routing table 800 in accordance with an embodiment of the present invention. The routing table 800 includes a plurality of entries 805 each of which includes a type field 810, a destination name(s) field 815, an occurrence threshold field 820, a time threshold field 825 and, in alternate embodiments, additional fields 830. The type field 810 identifies the type of the event message with which the entry 805 is associated. The destination name(s) field 815 contains one or more destination names to which an event notification should be sent. The occurrence threshold field 820 contains a value that is utilized as an occurrence threshold. Illustratively, the EMS suppresses repeated messages until the number of messages exceeds the occurrence of threshold value. For example, if the occurrence threshold field 820 is set to a value of 20, then a first event notification response is sent when the first occurrence occurs. Thereafter a second event notification is not sent until the 21st occurrence of the event. Similarly, the time threshold field 825 identifies a time threshold for repeated event notifications. For example, if the time threshold value is set to 30 minutes, then a second event notification is not sent until at least 30 minutes has elapsed since the previous notification for the same event. Illustratively, the thresholds are not exclusive, i.e., if the occurrence threshold is exceeded, an event notification may be sent even if the time threshold has not been exceeded, and vice versa.

FIG. 9 is a schematic block diagram of an exemplary destination table 900 in accordance with an embodiment of the present invention. The destination table 900 includes one or more entries 905, each of which comprises a destination name field 910, an e-mail address field 915, a simple network management protocol (SNMP) client field 920, a syslog field 925 and, in alternate embodiments additional fields 930. The destination name field 910 contains a user configurable name that is utilized within the routing table 900 to identify a particular destination. The e-mail address field 915 contains one or more e-mail addresses to which event notifications are sent. The SNMP client field 920 identifies one or more SNMP clients to which event notifications are sent. The syslog field 925 identifies one or more syslog demons to which event notifications are sent. The additional fields may identify other communication forms including, for example, pager numbers to which event notification should be transmitted. Thus, the destination table is utilized to expand a destination name into one or more destinations that receive the event notification.

Figure 10:
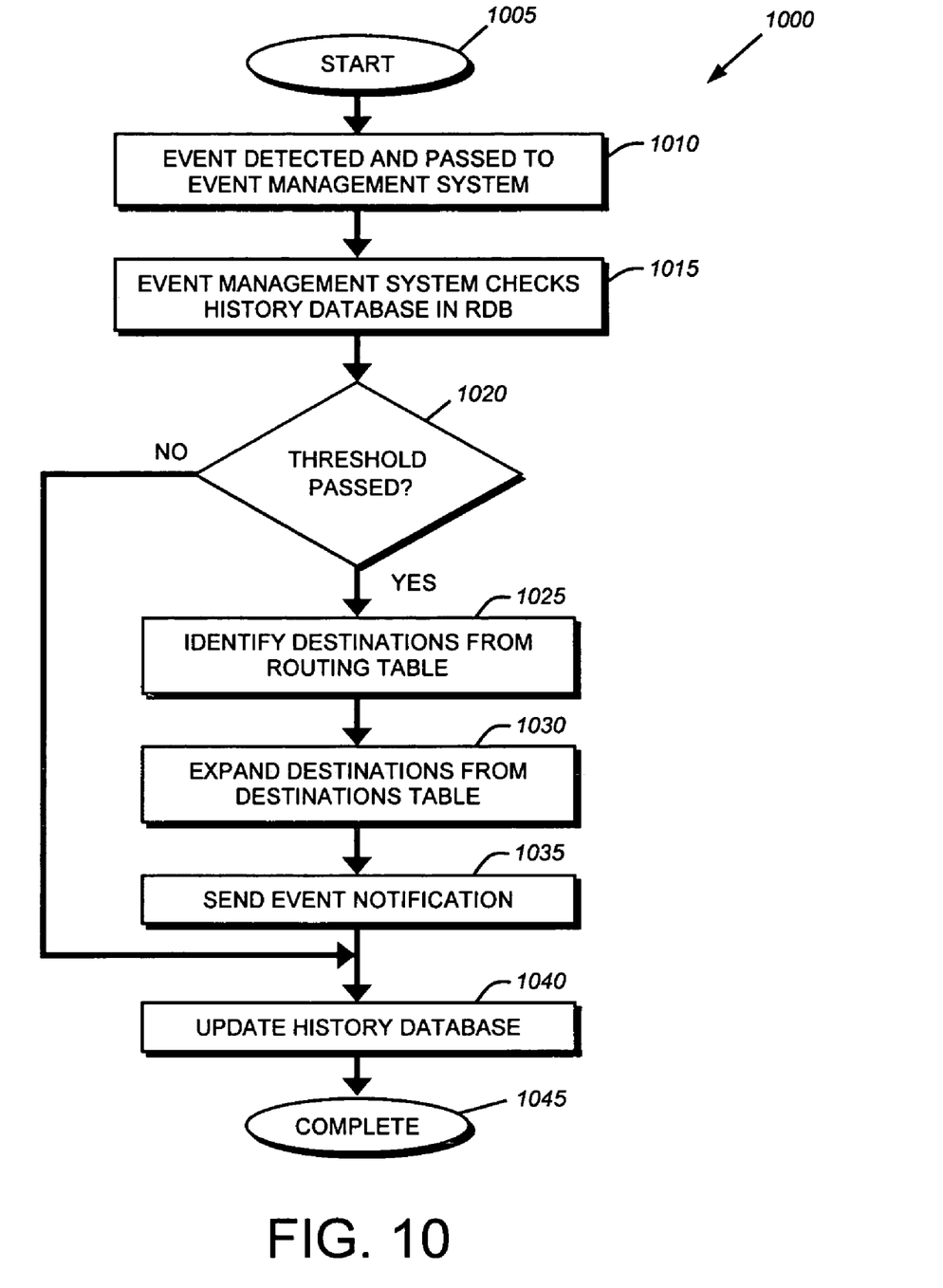
FIG. 10 is a flowchart detailing the steps of an exemplary procedure for processing event notifications in accordance with an embodiment of the present invention.

FIG. 10 is a flowchart detailing the steps of the procedure 1000 for processing event notifications in accordance with an embodiment of the present invention. The procedure 1000 begins in step 1005 and continues to step 1010 where an event is detected and passed to the EMS 620. In response, the EMS, checks the history database 680 stored within the RDB 650 in step 1015 and determines, in step 1020, whether any thresholds set for the event have been exceeded. This determination is made by examining the threshold values set in the routing table 800 and comparing them with history information (in the database 680) for the event. Illustratively, the history database tracks the number of occurrences of each event along with the time of the last occurrence of the event.

If any thresholds have been exceeded, the procedure continues to step 1025 where the EMS 620 identifies the appropriate destination name(s) from the routing table before expanding the destinations using the destination table 900 in step 1030. In step 1035, the appropriate event notifications are then conveyed (transmitted) as defined by the destination table. For example, email notifications may be sent to the administrator, log messages may be sent to syslog daemons, pages may be sent to phone numbers identified in the destination table, etc. The EMS then updates the history database 680 in step 1040 by, for example, logging the type of event and a timestamp and the procedure completes in step 1045. However, if in step 1020, it is determined that no threshold values have been exceeded, the procedure branches to step 1040 where the EMS updates the history database before completing in step 1045.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for event notification, comprising:
    configuring a plurality of nodes interconnected into a clustered storage system environment, wherein each node comprises a processor and a memory;
    detecting, by an event monitoring system within the clustered storage system environment, that an event of the plurality of nodes has occurred;
    in response to detecting the event, determining, by the event monitoring system, whether a predefined threshold associated with the detected event has been exceeded based on a routing table stored at a replicated data store that is accessible from each node of the plurality of nodes of the clustered storage environment, wherein the predefined threshold limits a number of repeated occurrences of event notifications for the event and wherein the predefined threshold comprises at least one of an occurrence threshold and a time threshold;
    in response to determining that the predefined threshold has been exceeded,
        identifying, by the event monitoring system, at least one destination name associated with the detected event from the routing table,
        accessing a destination table stored at the replicated data store to expand the at least one destination name into one or more destinations,
        sending, by the event monitoring system, at least one event notification to the one or more destinations;
    in response to determining that the predefined threshold has not been exceeded,
        suppressing the at least one event notification to the one or more destinations, and
        updating a history database to track a last occurrence of the detected event.

2. The method of claim 1 wherein sending the at least one event notification comprises sending at least one electronic mail message.

3. The method of claim 1 wherein the destination table comprises at least one entry, the at least one entry comprising a destination name field, and an electronic mail address field.

4. The method of claim 1 wherein the routing table comprises a message name field, a destination name field, and at least one threshold field.

5. A system configured to provide event notification, comprising:
    a plurality of interconnected nodes configured to communicate in a clustered storage system environment, wherein each node comprises a processor and a memory;
    means for detecting that an event of the plurality of nodes has occurred within the clustered storage system environment;
    in response to detecting that the event has occurred, wherein the predefined threshold limits a number of repeated occurrences of event notifications for the event and wherein the predefined threshold comprises at least one of an occurrence threshold and a time threshold,
        means for determining whether a predefined threshold associated with the event has been exceeded based on a routing table stored at a replicated data store that is accessible from each node of the plurality of nodes;
    in response to determining that the predefined threshold has been exceeded,
        means for identifying at least one destination name associated with the detected event from the routing table and means for accessing a destination table stored at the replicated data store to expand the at least one destination name into one or more destinations,
        means for sending at least one event notification to the one or more destinations,
        means for updating a history database of the replicated data store;
    in response to determining that the predefined threshold has not been exceeded,
        means for suppressing the at least one event notification to the one or more destinations, and
        means for updating a history database to track a last occurrence of the detected event.

6. The system of claim 5 wherein the means for sending the at least one event notification comprises means for sending at least one electronic mail message.

7. The system of claim 5 wherein the destination table comprises at least one entry, the at least one entry comprising a destination name field, and an electronic mail address field.

8. The system of claim 5 wherein the routing table comprises a message name field, a destination name field, and at least one threshold field.

9. A non-transitory computer readable storage medium containing executable program instructions executed by a processor comprising:
    program instruction that configure a plurality of nodes interconnected into a clustered storage system environment;
    program instruction that detect that an event associated with the plurality of nodes has occurred; and in response to detecting the event, program instruction that determine whether a predefined threshold associated with the event has been exceeded based on a routing table stored at a replicated data store that is accessible from each node of the plurality of nodes, wherein the predefined threshold limits a number of repeated occurrences of event notifications for the event and wherein the predefined threshold comprises at least one of an occurrence threshold and a time threshold;

in response to determining that the predefined threshold has been exceeded,
program instruction that identify at least one destination name associated with the detected event from the routing table stored at the replicated data,
program instruction that access a destination table stored at the replicated data store to expand the at least one destination name into one or more destinations and send at least one event notification to the one or more destinations, in response to determining that the predefined threshold has not been exceeded,
program instruction that suppress the at least one event notification to the one or more destinations, and
program instruction that update a history database to track a last occurrence of the detected event.

10. The system of claim 9 wherein the destination table comprises at least one entry, the at least one entry comprising a destination name field, and an electronic mail address field.

11. The system of claim 9 wherein the routing table comprises a message name field, a destination name field, and at least one threshold field.

* * * * *

UNITED STATES PATENT AND TRADEMARK OFFICE
CERTIFICATE OF CORRECTION

PATENT NO. : 8,255,425 B1
APPLICATION NO. : 11/264588
DATED : August 28, 2012
INVENTOR(S) : Dongfeng Li Page 1 of 1

It is certified that error appears in the above-identified patent and that said Letters Patent is hereby corrected as shown below:

Col. 7, line 30 should read: "sions, size and block ~~locals tion~~location). The file system uses files to"

Col. 8, line 15 should read: "another alternate embodiment of the invention, the ~~zo~~ pro-"

Col. 8, line 45 should read: "system" should ~~to~~ therefore be taken broadly to include such"

Signed and Sealed this
Twenty-seventh Day of November, 2012

David J. Kappos
*Director of the United States Patent and Trademark Office*